United States Patent [19] [11] 3,798,615
Weisbecker [45] Mar. 19, 1974

[54] COMPUTER SYSTEM WITH PROGRAM-CONTROLLED PROGRAM COUNTERS

[75] Inventor: Joseph A. Weisbecker, Cherry Hill, N.J.

[73] Assignee: RCA Corporation, New York, N.Y.

[22] Filed: Oct. 2, 1972

[21] Appl. No.: 293,680

[52] U.S. Cl. 340/172.5
[51] Int. Cl. G06f 13/00
[58] Field of Search 340/172.5

[56] References Cited

UNITED STATES PATENTS

| | | | |
|---|---|---|---|
| 3,373,408 | 3/1968 | Ling | 340/172.5 |
| 3,268,874 | 8/1966 | Bock | 340/172.5 |
| 3,373,407 | 3/1968 | Ling | 340/172.5 |
| 3,374,465 | 3/1968 | Richmond et al. | 340/172.5 |
| 3,387,283 | 6/1968 | Snedaker | 340/172.5 |
| 3,483,519 | 12/1969 | Hunter et al. | 340/172.5 |
| 3,611,315 | 10/1971 | Masuo Murano et al. | 340/172.5 |
| 3,701,977 | 10/1972 | Mendelson et al. | 340/172.5 |
| 3,705,389 | 12/1972 | Krock et al. | 340/172.5 |

*Primary Examiner*—Gareth D. Shaw
*Assistant Examiner*—Melvin B. Chapnick
*Attorney, Agent, or Firm*—Edward J. Norton; Carl V. Olson

[57] ABSTRACT

A computer system which is especially suitable for small scale computers, and which includes a main memory, a scratch pad memory having storage locations for main memory addresses and for operands, a P register for containing the address of any storage location in the scratch pad memory currently used as a program counter, and an instruction register including a portion I for an operation code, and a portion N for the address of any storage location in said scratch pad memory. During an instruction fetch cycle, the contents of the P register are used to address the current program counter location in the scratch pad memory, the contents of the program counter location are used to address the main memory and transfer an instruction therefrom to the instruction register, and the contents of the program counter location are incremented. During an instruction execute cycle, the program can cause any other scratch pad storage location to become the current program counter by transferring the contents of the portion N of the instruction register to the P register.

1 Claim, 3 Drawing Figures

COMPUTER SYSTEM WITH PROGRAM-CONTROLLED PROGRAM COUNTERS

BACKGROUND OF THE INVENTION

The invention relates to stored program computers, and particularly to the architecture thereof. The invention has particular application to "mini-mini" or "micro" computers intended to be more powerful than existing electronic calculators and less expensive than existing minicomputers. Large scale integration techniques have progressed to the point that random access semiconductor memories are now available in large sizes on a single chip. It is therefore desirable to employ a computer architecture adapted for a small processor to be constructed on one or two additional chips, so that the cost of a processor can be reduced sufficiently to attain widespread use for all sorts of personal, educational and recreational purposes, in addition to commercial purposes.

SUMMARY OF THE INVENTION

A computer architecture is provided in which the contents of a P register are used to address a program counter at any storage location in a scratch pad memory, and the contents of the program counter are used to fetch an instruction from any location in a main memory. The contents of the P register can be changed by an instruction in the program, so that the scratch pad memory may contain any desired number of program counters for respective different program routines.

DESCRIPTION OF FIG. 1

Figure 1:
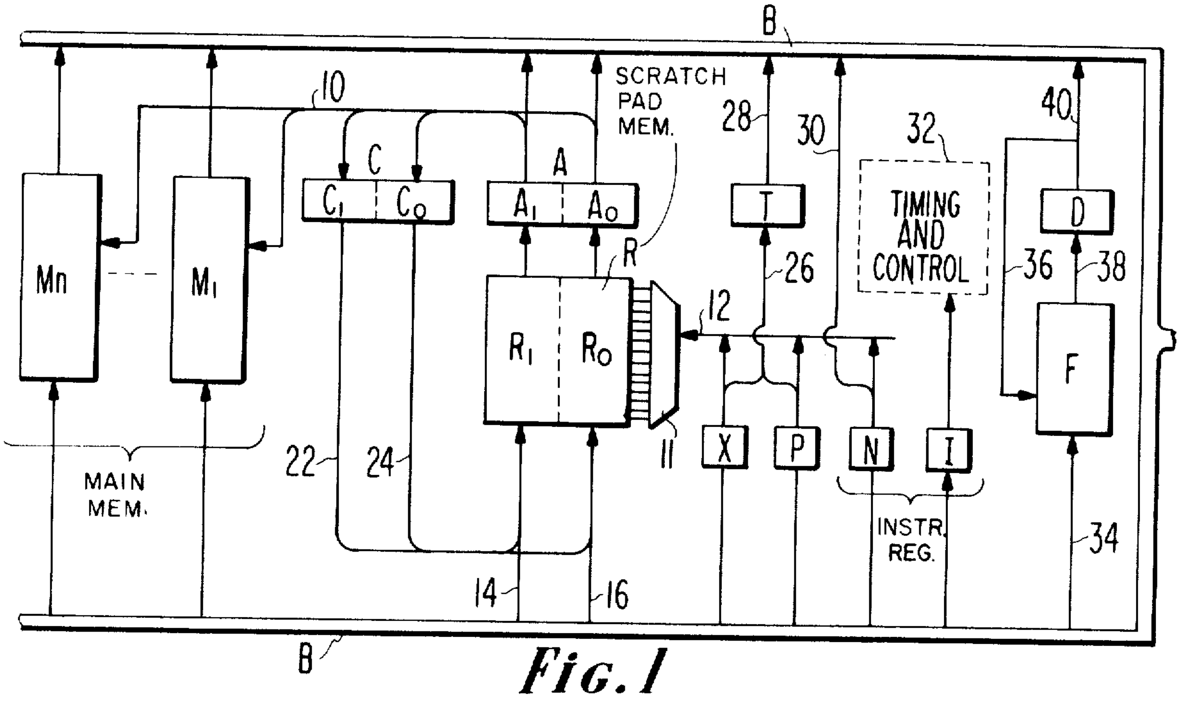
FIG. 1 is a block diagram of a computer system constructed in accordance with the teachings of the invention.

Referring now in greater detail to FIG. 1, there is shown a computer system including a main memory consisting of one or more memory banks M1 through M*n*. Each main memory bank may be a semiconductor random access memory arranged to receive an eight-bit word for storage from an eight-bit or one-byte data bus B, and to supply an eight-bit word from storage to the eight-bit data bus B.

The particular word storage location in the main memory which is addressed for receiving or supplying a word is determined by a 16-bit address supplied over lines 10 from a register A having two eight-bit or one-byte portions $A_1$ and $A_0$. Register A receives two-byte words read out from a semiconductor scratch pad memory R having storage locations for 16 two-byte (16-bit) words. Any one of the 16, 16-bit storage locations in scratch pad memory R may receive information for storage from the data bus B in two sequential eight-bit transfers over lines 14 and 16 to portions $R_1$ and $R_0$, respectively, of the memory R. Any one of the sixteen storage locations in the scratch pad memory may also receive information for storage from the 16-bit register A via a 16-bit incrementing register C, having portions $C_1$ and $C_0$, in one transfer over lines 22 and 24.

The particular one of the 16 word storage locations in scratch pad memory R which is addressed for reading out information, or writing in information, is determined by four address bits supplied to the address decoder 11 of the scratch pad memory R over lines 12 from one of three four-bit registers X, P and N. Register P is used for addressing the one of the 16 word storage locations in the scratch pad memory R which is currently employed as a program counter. The contents of the two four-bit registers X and P may be transferred over lines 26 and gates 51' to temporary eight-bit register T, prior to transfer over lines 28 and gates 59 to the eight-bit data bus B. The contents of four-bit register N may be transferred over lines 30 to the data bus.

The computer system includes an instruction register having a four-bit portion I for an operation code, and four-bit portion N, previously referred to as one of the registers X, P and N, used for addressing the scratch pad memory $R_1$, $R_0$. The contents of the operation code register I are supplied to timing and control means generally designated 32 by which movements of data through the data paths shown in FIG. 1 are controlled.

An arithmetic or functional unit F is provided which is capable of performing addition, subtraction, the "and" function, and the "exclusive or" function of an eight-bit operand received over lines 34 from the data bus B, and received over lines 36 from an eight-bit accumulator register D. The register D receives results over lines 38 from functional unit F, and can forward the results over lines 40 to the data bus B.

Figure 2:
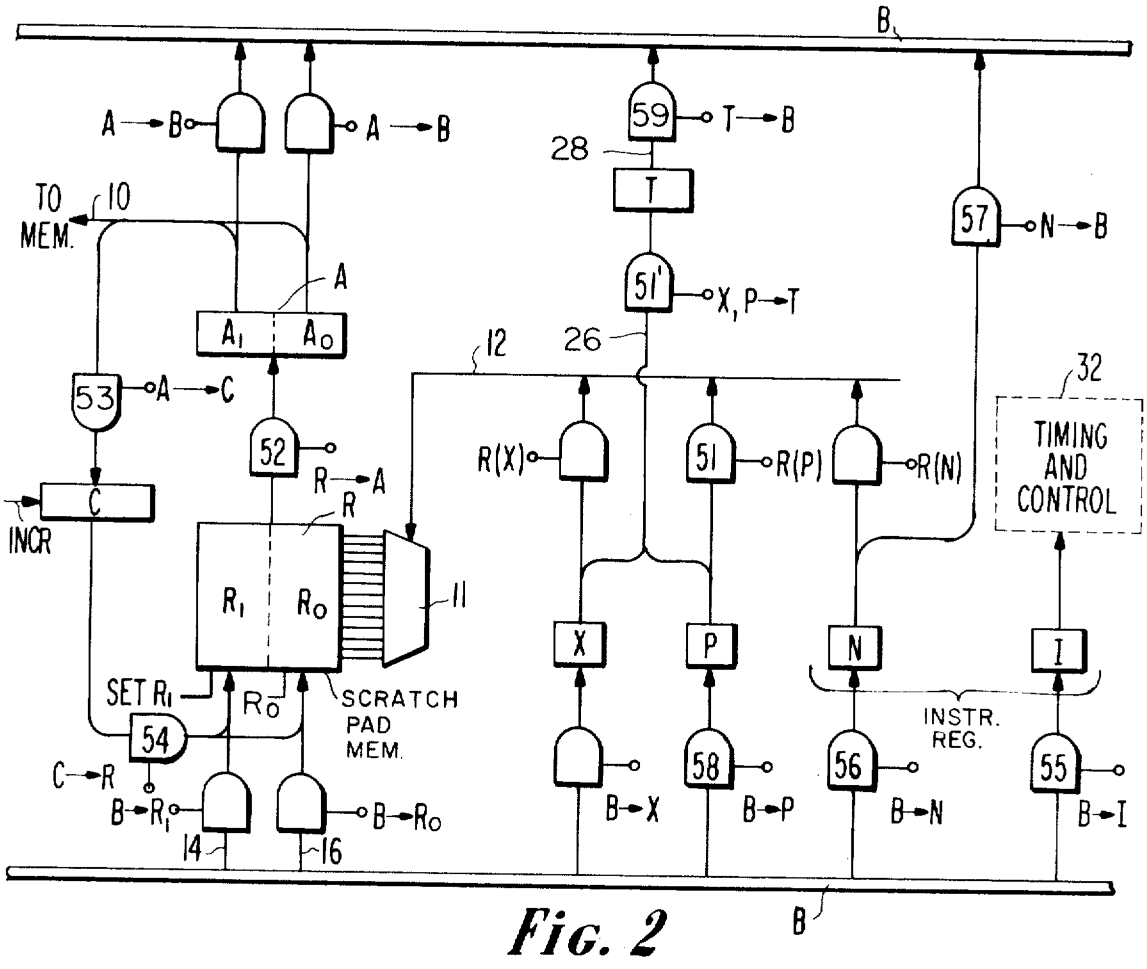
FIG. 2 is a diagram in greater detail of a portion of the diagram in FIG. 1.
Figure 3:
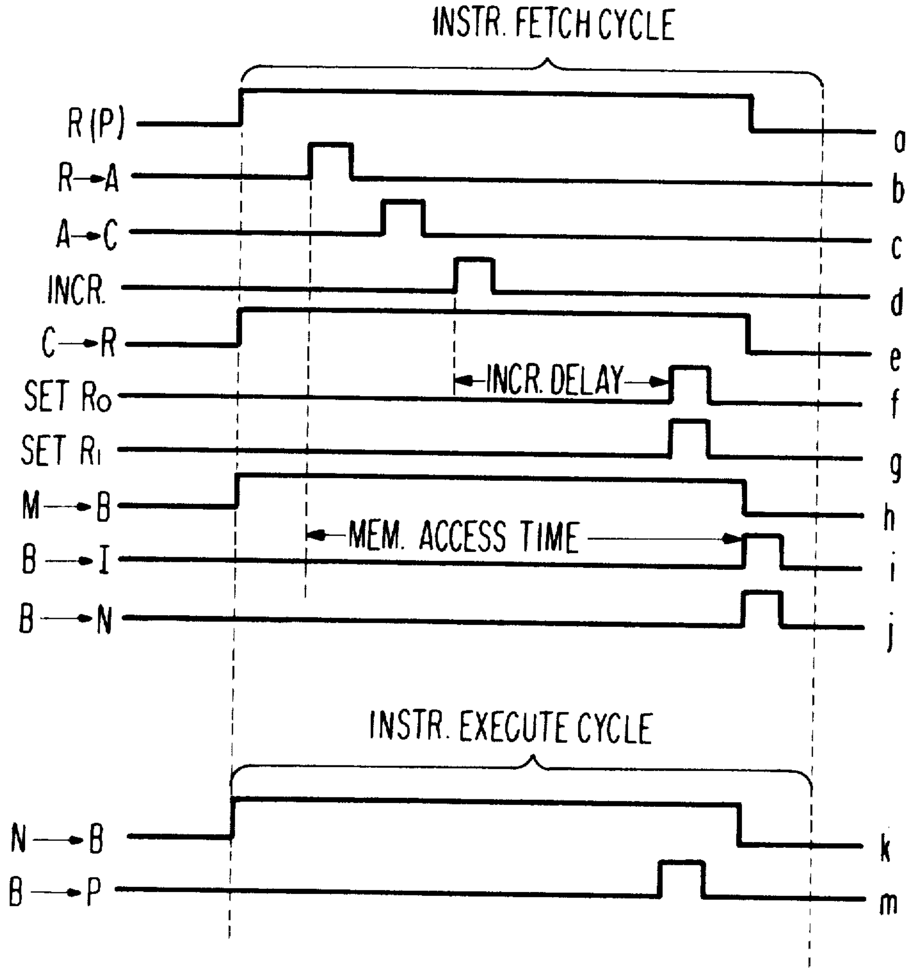
FIG. 3 is a set of waveforms that will be referred to in describing the operation of the system of FIGS. 1 and 2.

FIG. 2 shows the central portion of FIG. 1 in greater detail with gates positioned in data paths, the gates being enabled by indicated signals supplied by the timing and control unit 32. Each gate symbol in FIG. 2 represents a plurality of individual gates equal in number to the number of data lines controlled by the enabling signal. FIG. 3 shows the time relations of certain signals during an instruction fetch cycle, and during an instruction execute cycle.

OPERATION

The operation of the computer system will now be described with references to FIGS. 1, 2 and 3. The computer system alternates between an instruction fetch cycle, and an instruction execute cycle. An instruction is fetched from the main memory M to the instruction register portions I and N. The instruction fetch cycle involves the use of the four-bit contents of the P register to address a program counter storage location in the scratch pad memory R. This is accomplished by enabling the gates 51 with a signal R(P), as shown in FIG. 3*a*, from the control unit 32 to pass the contents of register P through lines 12 to the decoder 11. The decoder receives four bits from register P and accesses a corresponding one of 16 storage locations in scratch pad memory R. The contents of the counter in the addressed storage location in the scratch pad memory R are read out through the gates 52, which are enabled by the signal R → A shown in FIG. 3*b*, to register A. The 16-bit contents of register A are applied over lines 10 to the main memory M to address an instruction word storage location therein.

While the main memory M is being accessed during the interval indicated in FIG. 3*i*, the 16-bit main memory address in register A is also applied through gates 53, which are enabled by signal A → C (FIG. 3c), to the register C. The main memory address then in register C is incremented (increased or decreased) by signal INCR (FIG. 3d) so that the contents represent the address of the next instruction in a list of instructions in the main memory M. The incremented contents of register C are passed through gates 54 enabled by signal C → R (FIG. 3e) and stored, by Set $R_1$ and $R_0$ signals (FIGS. 3f and 3g), in the register R at the location still addressed by the contents of the register P. This incrementing of the contents of the addressed program storage location in the scratch pad memory is what makes the storage location a "program counter."

In the meantime, the previously addressed instruction in the main memory M is read out of the memory to the bus B by a signal M → B (FIG. 3h). Then, four bits of the instruction are passed from the bus B to instruction register operation code portion I by gates 55 which are enabled by signal B → I (FIG. 3i). At the same time, the other four bits of the instruction are passed from the bus B to instruction register portion N by gates 56 which are enabled by signals B → N (FIG. 3j). An instruction has now been fetched from the main memory M and has been transferred to the instruction register I,N.

The computer then enters into an instruction execution cycle in which the instruction operation code in register I is decoded in timing and control unit 32. Unit 32 then issues signals which control the flow of information along data paths. For example, the operation code in register I may be one which the control unit 32 responds to by issuing an enabling signal N → B (FIG. 3k) to gates 57, so that the contents of instruction register portion N are transferred to the data bus B. Then, the control unit 32 issues an enabling signal B → P (FIG. 3m) to gates 58, so that the contents of register N are transferred from the bus B to the register P. In this example, the instruction is one which changes the contents of register P so that it points to a new program counter in scratch pad memory R. The new counter may be at any location in the memory R.

There follows a list of instructions which, by way of example only, are used in an actually constructed and operated computer. The instruction designated I1 means that the digit in register I has a value 1, and I2 means that the digit in I has a value 2, etc. R(N) is used to denote the R register specified by the 4-bits contained in the N register M(R(N)) refers to a one-byte (eight-bit) memory location addressed by the contents of R(N):

I1 — R(N)+1 → R(N)
The 16 bits in the R register specified by the current digit in N are incremented.

I2 — R(N)−1 → R(N)
The 16 bits of R(N) are decremented by one.

I4 — M(R(N)) → D, R(N)+1 → R(N)
The M byte addressed by R(N) is read from M and placed in D. R(N) is incremented by one.

I5 — D → M(R(N))
The byte in D is written to the M byte location addressed by R(N).

I8 — Rφ(N) → D
The least significant byte of R(N) is placed in D.

I9 — R1(N) → D
The most significant byte of R(N) is placed in D.

IA — D → Rφ(N)

The byte in D replaces the least significant byte of R(N).

IB — D → R1(N)
The byte in D replaces the most significant byte of R(N).

IC — Dφ → Rφφ(N)
The least significant four bits (digit) in D replace the least significant digit of R(N).

ID — N → P
The four bit digit in N is placed in P. This effectively changes the current program counter and constitutes a branch.

IE — N → X
The four bit digit in N is placed in X.

IF — Perform function specified by digit in N:
Nφ — M(R(X)) → D
N1 — M(R(X)) "OR" D → D
N2 — M(R(X)) "AND" D → D
N3 — M(R(X)) "EXCL.OR" D → D
N4 — M(R(X)) +D → D [BIN.ADD,FINAL →CARRY DF]
N5 — M(R(X)) −D → D [BIN.SUBT.,FINAL →CARRY DF]
N6 — SHIFT D RIGHT 1 BIT [LSB → DF]
Note that a flag bit (DF) is provided. This flag can be tested by the following branch instruction.

I3 — Conditional branch
N specifies the condition to be tested.
Nφ — unconditional branch
N1 — byte in D not all zeros
N2 — byte in D all zeros
N3 — D flag (DF) equals one
N4 — external byte flag set
N5 — external program flag set
N6 — external error flag set
N7 — external direct flag set The last four tests concern the external interface. If the condition specified by N exists, the M byte following the I3 instruction is read from M and replaces the least significant byte of R(P). This permits direct branching within a 256 byte mini-page. If the specified test condition is not present, the M byte following I3 is skipped and the next instruction in sequence will be fetched. Iφ, I6, and I7 are concerned with external control.

In the above list of instructions, it is seen that when the four bits in the portion I of the instruction register have the value I3 (hexidecimal D), the four-bit contents of the portion N of the instruction register are transferred to register P. This effectively changes the program counter and constitutes a branch to another sequence of instructions stored in main memory M. The next instruction fetched will be at a location in the main memory M having the address stored in scratch pad memory R at a location having the address now present in register P.

It is seen that any storage location in scratch pad memory can be used as a program counter. The particular location that is used as the program counter is determined by the address currently in register P. The address in register P can be changed at any time by program by an instruction causing a new value to be inserted into register P. The computer can thus be made to jump from one to another among a plurality of routines. An interrupted routine is later resumed at the point at which it was interrupted.

What is claimed is:

1. A computer system, comprising a main memory, a scratch pad memory having storage locations for main memory addresses and for operands, a P register for containing the address of any storage location in said scratch pad memory currently used as a program counter, an instruction register including a portion I for an operation code, and a portion N for the address of any storage location in said scratch pad memory, means to perform an instruction fetch cycle including, means utilizing the contents of the P register to address the current program counter location in said scratch pad memory, means using the contents of the program counter location to address said main memory and transfer an instruction therefrom to said instruction register, and means to modify the contents of the program counter location, and means to perform an instruction execute cycle including means to decode the contents of the I portion of the instruction register to cause a transfer of the contents of the N portion of the instruction register to said P register, whereby the storage location in said scratch pad memory utilized as a program counter can be changed to any desired location therein.

* * * * *